United States Patent
Miyazawa

(10) Patent No.: US 9,131,030 B2
(45) Date of Patent: Sep. 8, 2015

(54) COMMUNICATION DEVICE, COMMUNICATION METHOD AND COMPUTER READABLE MEDIUM STORING INSTRUCTIONS FOR MEASURING AVAILABLE BANDWIDTH DURING DATA COMMUNICATION

(75) Inventor: Jun Miyazawa, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 872 days.

(21) Appl. No.: 13/337,764

(22) Filed: Dec. 27, 2011

(65) Prior Publication Data
US 2012/0163221 A1    Jun. 28, 2012

(30) Foreign Application Priority Data
Dec. 28, 2010  (JP) .................................. 2010-292324

(51) Int. Cl.
*H04W 28/02*    (2009.01)
*H04L 29/06*    (2006.01)
*H04L 12/26*    (2006.01)

(52) U.S. Cl.
CPC .......... *H04L 65/602* (2013.01); *H04L 43/0882* (2013.01); *H04L 65/80* (2013.01)

(58) Field of Classification Search
CPC .. H04L 12/26; H04L 43/0882; H04L 43/0876
USPC .......................................................... 370/252
See application file for complete search history.

(56) References Cited

U.S. PATENT DOCUMENTS

| | | | |
|---|---|---|---|
| 2004/0171388 A1* | 9/2004 | Couronne et al. | ......... 455/456.1 |
| 2009/0122716 A1* | 5/2009 | Hayashi | ........................ 370/252 |
| 2012/0224851 A1* | 9/2012 | Takara et al. | ................... 398/45 |

OTHER PUBLICATIONS

Tsugawa et al., "Implementation and Evaluation of an Inline Network Measurement algorithm and its Application Technique", from Technical Report of the Institute of Electronics, Information and Communication Engineers, (IN2005-120) Dec. 2005 pp. 79-84.

* cited by examiner

Primary Examiner — Wutchung Chu
Assistant Examiner — Jason Harley
(74) Attorney, Agent, or Firm — Banner & Witcoff, Ltd.

(57) ABSTRACT

A communication device measures an available bandwidth, which is a bandwidth that can be used for data communication, while changing a transmission rate of packets. The communication device comprises a range determination portion that sets a reference point and determines a search range, a bandwidth setting portion that sets a measurement bandwidth, a first generation portion that generates media data, a second generation portion that generates redundant data, a packet generation portion that packetizes the media data and the redundant data, and a packet transmission portion that transmits measurement packets.

15 Claims, 10 Drawing Sheets

COMMUNICATION DEVICE, COMMUNICATION METHOD AND COMPUTER READABLE MEDIUM STORING INSTRUCTIONS FOR MEASURING AVAILABLE BANDWIDTH DURING DATA COMMUNICATION

CROSS-REFERENCE TO RELATED APPLICATION

This application claims priority to Japanese Patent Application No. 2010-292324, filed Dec. 28, 2010, the disclosure of which is incorporated herein by reference in its entirety.

BACKGROUND

The present disclosure relates to a communication device, a communication method and a computer readable medium storing instructions that are capable of measuring an available bandwidth while data communication is performed.

In public networks, such as the Internet, it is necessary to transmit and receive data at a transmission rate that is appropriate for an available bandwidth, which is the maximum bandwidth that can be used for data communication between communication devices. In this type of network, the available bandwidth varies depending on a region, a provider, a time zone, and other situations.

The following type of measurement method is known in order to measure the varying available bandwidth while transmitting and receiving media data, such as audio data. A transmission-side communication device sets a search range, which is a bandwidth range that becomes a measurement target. Next, the transmission-side communication device sequentially transmits a plurality of packets to measure the bandwidth in the set search range while changing a transmission interval. A difference between the transmission interval of the packets and a reception interval is calculated. The transmission interval is calculated from time information in the packets and the reception interval is recorded by a receiving-side communication device. The most recent available bandwidth is measured from a change tendency of the calculated plurality of difference values. When one cycle of bandwidth measurement is completed, a next search range is set based on a past measurement result and the next measurement processing is performed.

With the above-described measurement method, the search range is set centering on a reference point that indicates the most recent measurement result, and the bandwidth to transmit packets is selected from the set search range. The transmission-side communication device needs to transmit packets in a wider bandwidth than the most recent measurement result. A wide bandwidth is used for data communication and network load increases. Therefore, the receiving-side communication device may not be able to receive media data properly.

Various exemplary embodiments of the general principles herein provide a communication device, a communication method and a computer program that are capable of measuring an available bandwidth while transmitting media data properly.

The exemplary embodiments provide a communication device that measures an available bandwidth, which is a bandwidth that can be used for data communication, while changing a transmission rate of packets, the communication device comprising: a range setting portion that, based on a bandwidth measurement result, sets a reference point indicating a bandwidth value to be used as a reference for a next bandwidth measurement, and sets a search range, which is a bandwidth range that becomes a measurement target, centering on the reference point; a bandwidth setting portion that sets a bandwidth which has not been measured and which is included in the search range, as a measurement bandwidth which is a measurement target bandwidth; a first generation portion that generates media data at a constant interval, at a first generation rate that is lower than the reference point; a second generation portion that, in a case where the measurement bandwidth set by the bandwidth setting portion is higher than the first generation rate, generates redundant data that is capable of complementing the media data generated by the first generation portion, at a second generation rate corresponding to not more than a difference between the measurement bandwidth and the first generation rate; a packet generation portion that packetizes the media data generated by the first generation portion and the redundant data generated by the second generation portion, and thereby generates measurement packets; and a packet transmission portion that transmits the measurement packets generated by the packet generation portion to the measurement bandwidth set by the bandwidth setting portion.

The exemplary embodiments also provide a communication method that is performed by a communication device that measures an available bandwidth, which is a bandwidth that can be used for data communication, while changing a transmission rate of packets, the communication method comprising the steps of: setting, based on a bandwidth measurement result, a reference point indicating a bandwidth value to be used as a reference for a next bandwidth measurement, and determining a search range, which is a bandwidth range that becomes a measurement target, centering on the reference point; setting a bandwidth which has not been measured and which is included in the search range, as a measurement bandwidth which is a measurement target bandwidth; generating media data at a constant interval, at a first generation rate that is lower than the reference point; generating, in a case where the set measurement bandwidth is higher than the first generation rate, redundant data that is capable of complementing the generated media data, at a second generation rate corresponding to not more than a difference between the measurement bandwidth and the first generation rate; packetizing the generated media data and the generated redundant data, and thereby generating measurement packets; and transmitting the generated measurement packets to the set measurement bandwidth.

The exemplary embodiments also provide a computer program product stored on a non-transitory computer-readable medium, comprising instructions for causing a computer of a communication device that measures an available bandwidth, which is a bandwidth that can be used for data communication, while changing a transmission rate of packets to execute the steps of: setting, based on a bandwidth measurement result, a reference point indicating a bandwidth value to be used as a reference for a next bandwidth measurement, and determining a search range, which is a bandwidth range that becomes a measurement target, centering on the reference point; setting a bandwidth which has not been measured and which is included in the search range, as a measurement bandwidth which is a measurement target bandwidth; generating media data at a constant interval, at a first generation rate that is lower than the reference point; generating, in a case where the set measurement bandwidth is higher than the first generation rate, redundant data that is capable of complementing the generated media data, at a second generation rate corresponding to not more than a difference between the measurement bandwidth and the first generation rate; packetizing the generated media data and the generated redundant data, and thereby generating measurement packets; and transmitting the generated measurement packets to the set measurement bandwidth.

BRIEF DESCRIPTION OF THE DRAWINGS

Exemplary embodiments of the present disclosure will be described below in detail with reference to the accompanying drawings in which.

DETAILED DESCRIPTION

Figure 1:
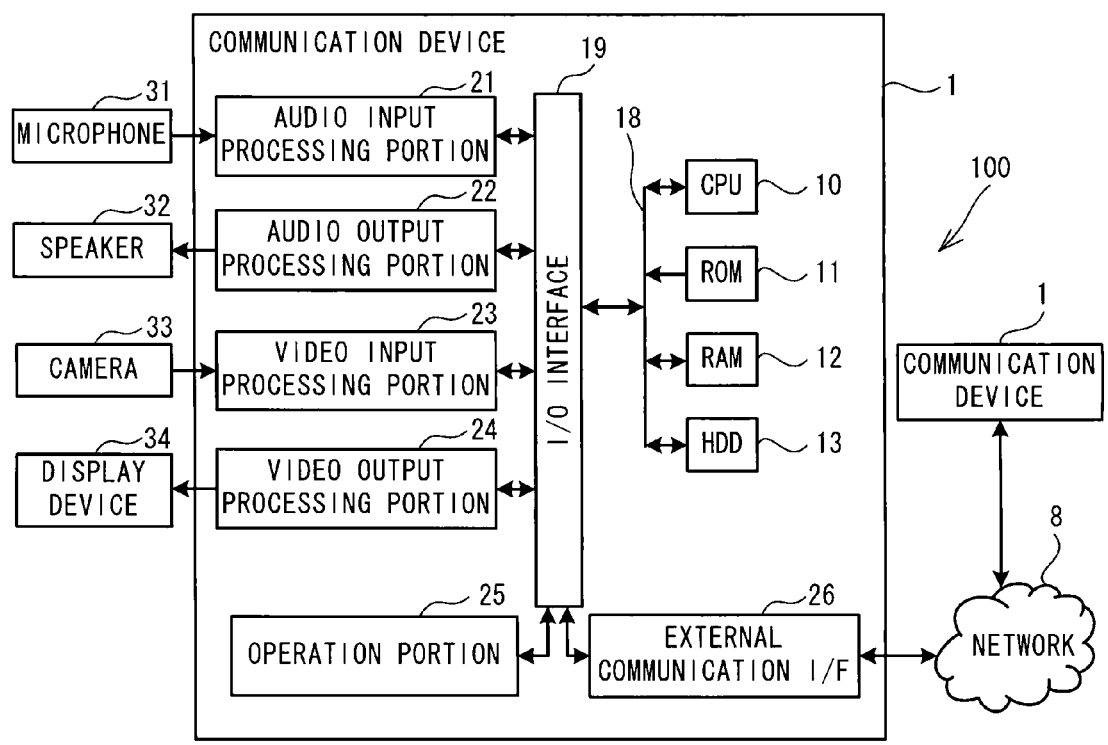
FIG. 1 is a diagram showing an electrical configuration of a communication device 1 and a configuration of a bandwidth measurement system 100.

A communication device 1 that is an exemplary embodiment of the present disclosure, and a bandwidth measurement system 100 that is provided with a plurality of the communication devices 1 will be explained with reference to the drawings. The drawings that are referred to are used to explain technical features that the present disclosure can adopt. A device configuration, flowcharts of various types of processing, and the like that are shown in the drawings are simply explanatory examples and do not limit the present disclosure to only those examples.

The bandwidth measurement system 100 will be explained. As shown in FIG. 1, the bandwidth measurement system 100 is provided with at least two of the communication devices 1. The communication device 1 connects to another of the communication devices 1 via a network 8. The communication device 1 performs communication of various types of data with the other communication device 1.

The bandwidth measurement system 100 of the present embodiment is a video conference system for users at a plurality of bases to perform a video conference. Each of the communication devices 1 shares audio and video of the plurality of bases by mutually transmitting and receiving audio data and moving image data, so that the video conference can be held. During the video conference, each of the communication devices 1 can also transmit and receive data of materials (documents etc.) used in the video conference. The user can carry out the video conference while looking at the same materials as those of other users.

Audio data, moving image data, material data, data indicating a pointer position on a screen, and control information etc. are collectively referred to as "media data". More specifically, images and audio that are encoded by an encoder (not shown in the drawings), and digital data such as control information etc. are referred to as the "media data". It is sufficient if the communication device 1 can perform data communication via the network 8. Specifically, the communication device 1 may be a dedicated video conference terminal that is provided at each of the bases to perform video conferences, or may be a personal computer that performs various types of information processing.

Each of the communication devices 1 can measure an available bandwidth while packetizing the media data and transmitting/receiving the packetized media data. The "available bandwidth" is the maximum bandwidth that can be used for data communication between the communication devices 1. In other words, the "available bandwidth" is the maximum transmission rate at which the receiving-side communication device 1 can receive data at substantially the same transmission rate as that of the data transmitted by the transmission-side communication device 1.

In order to compare the bandwidth with the transmission rate between the communication devices 1, the bandwidth is expressed by a transmission path capacity (bps). If packets are transmitted at a transmission rate that exceeds the available bandwidth, packet loss and transmission delay etc. due to congestion occur. On the other hand, if the communication device 1 reduces the transmission rate of the data too much, it is not possible to sufficiently use the bandwidth and efficiency deteriorates. Accordingly, each of the communication devices 1 controls the transmission rate of the data in accordance with a measurement result of the available bandwidth.

An electrical configuration of the communication device 1 will be explained. As shown in FIG. 1, the communication device 1 is provided with a CPU 10 that controls the communication device 1. A ROM 11, a RAM 12, a hard disk drive (hereinafter referred to as an "HDD") 13 and an input/output (I/O) interface 19 are connected to the CPU 10 via a bus 18.

The ROM 11 stores programs and initial values etc. to operate the communication device 1. The RAM 12 temporarily stores various types of information used by a control program. The HDD 13 is a non-volatile storage device that stores various types of information of the control program etc. A storage device, such as an EEPROM or a memory card, may be used in place of the HDD 13.

An audio input processing portion 21, an audio output processing portion 22, a video input processing portion 23, a video output processing portion 24, an operation portion 25 and an external communication I/F 26 are connected to the I/O interface 19. The audio input processing portion 21 processes input of audio data from a microphone 31 that inputs audio. The audio output processing portion 22 processes operations of a speaker 32 that outputs audio. The video input processing portion 23 processes input of moving image data from a camera 33 that captures video. The video output processing portion 24 processes operations of a display device 34 that displays video. The operation portion 25 is used by the user to input various types of commands to the communication device 1. The operation portion 25 may be a keyboard and a mouse or the like that are connected to the I/O interface 19 from the outside of the communication device 1. The external communication I/F 26 connects the communication device 1 to the network 8.

A bandwidth measurement method that is used in the bandwidth measurement system 100 of the present embodiment will be schematically explained. In the bandwidth measurement system 100, the bandwidth measurement method described in the following document is used. "Tomoaki Tsugawa, Cao Le Thanh Man, Go Hasegawa and Masayuki Murata, "Implementation and evaluation of an inline network measurement algorithm ImTCP and its application technique" Technical Research Report of The Institute of Electronics, Information and Communication Engineers, (IN2005-120), p. 79-84, December 2005", the relevant portion of which is herein incorporated by reference.

The measurement principle will be explained. The communication device 1 that transmits data (hereinafter referred to as a "transmission device") packetizes media data to be transmitted into a plurality of packets. The transmission device sequentially transmits the plurality of packets to the other communication device 1 (hereinafter referred to as a "reception device") via the network 8. If the transmission rate (unit: bps) at which the packets are transmitted is equal to or less than the available bandwidth (unit: bps) between the transmission device and the reception device, the packets are not jammed (congested). If the packets are not jammed, a reception interval at which the reception device receives the plurality of packets transmitted by the transmission device is theoretically the same as a transmission interval at which the transmission device transmits the plurality of packets. On the other hand, if the transmission rate is higher than the available bandwidth, the packets are jammed and the reception interval becomes longer than the transmission interval.

When the available bandwidth is measured, the transmission device transmits the plurality of packets while gradually increasing the transmission interval or gradually shortening the transmission interval. The transmission rate when a certain packet is transmitted is obtained from the following Equation (1).

Transmission rate (bps)=packet size (bit)/transmission interval (s) between last packet transmission time and current packet transmission time     (1)

For example, when the plurality of packets are transmitted such that the transmission interval is gradually increased, the reception interval is longer than the transmission interval during a period in which the transmission rate is higher than the available bandwidth. As the transmission interval becomes longer, the transmission rate gradually decreases. When the transmission rate is equal to or less than the available bandwidth, the reception interval is the same as the transmission interval. Therefore, the transmission rate of data at a time point at which the value of "reception interval—transmission interval" changes can be measured as the available bandwidth.

While adjusting conditions, such as the packet size, the number of packets, the transmission interval and the like, the transmission device transmits a group of packets to determine whether the time point at which the value of "reception interval—transmission interval" changes exists in the bandwidth range used as a measurement target. If the transmission device increases the number of packets, the reception device that measures the available bandwidth can more finely determine the time point at which the value of "reception interval—transmission interval" changes. Therefore, the reception device can measure the available bandwidth more accurately.

However, as the number of the packets increases, more time is required for the transmission device and the reception device to perform various types of processing (for example, packet transmission/reception processing, processing of data included in the packets, and the like). In addition, if the transmission device increases the number of the packets while keeping the packet size constant, the time required from the start to the end of the transmission of the plurality of packets also increases. Therefore, it is desirable for the transmission device to determine packet generation conditions and transmission conditions while taking into consideration accuracy of a measurement result and the time required to obtain the measurement result.

An overview of measurement procedures will be explained. In the bandwidth measurement system 100, the available bandwidth is measured according to the following procedures 1 to 5.

Procedure 1: A search range is set.

The search range that is expected to include a current available bandwidth is set and thus it is possible to effectively measure the available bandwidth. When measurement processing is initially performed, an initial search range is set to a predetermined value.

Procedure 2: The search range is divided into one or a plurality of bandwidth sections.

When the available bandwidth is measured, the transmission device transmits a group of packets (hereinafter referred to as a "stream") including a plurality of packets, for each of small sections (hereinafter referred to as "bandwidth sections") obtained by dividing the search range. The stream is transmitted to determine whether the time point at which the value of "reception interval—transmission interval" changes exists in each of the bandwidth sections. As the number of the divided bandwidth sections is increased, a measurement result having a high tolerance to temporal abnormality can be obtained, and it is therefore possible to accurately detect the time point at which the value of "reception interval—transmission interval" changes. As the number of the divided bandwidth sections is reduced, the time required for the measurement processing is reduced and it is therefore possible to quickly obtain a measurement result.

Procedure 3: A stream corresponding to the search range is transmitted and received between the transmission device and the reception device.

The transmission device determines transmission conditions of streams to measure bandwidth in each of the bandwidth sections. The transmission conditions include the number of packets that form a stream, the packet size of each of the packets, and the transmission interval, which is a time period from when the last packet is transmitted to when the next packet is transmitted. Next, the transmission device generates a plurality of packets in accordance with the determined transmission conditions and transmits the packets. Each of the packets includes time information that is used by the reception device to calculate the transmission interval.

Procedure 4: A measurement result is obtained from a difference between the reception interval and the transmission interval.

The available bandwidth between the transmission device and the reception device is measured by the reception device. In the reception device, the reception interval is calculated from a time at which the packets are actually received, and the transmission interval is calculated from the time information included in the received packets. A relationship between the transmission rate of the data at which the packets are transmitted and the reception rate (bps) at which the packets are received is approximated by two straight lines using a linear regression method.

As a result, when the time point at which the value of "reception interval—transmission interval" changes exists, the transmission rate of the data at the time point of the change is identified as the available bandwidth, and a search bandwidth value $K_i$ at the time point of the change is acquired as a measurement result F of the available bandwidth. If the time point of the change does not exist and the value of "reception interval—transmission interval" is zero throughout the whole search range, it is determined that the available bandwidth exists in a range that is larger than the search range, and a maximum value of the search range is acquired as the provisional measurement result F. If the time point of the change does not exist and the value of "reception interval—transmission interval" is a positive value throughout the whole search range, it is determined that the available bandwidth exists in a range that is smaller than the search range, and a minimum value of the search range is acquired as the provisional measurement result F. The most recent measurement result F calculated by the reception device is notified to the transmission device.

Procedure 5: The processing returns to procedure 1 and the search range is reset to perform bandwidth measurement again.

In accordance with the most recent measurement result F notified from the reception device, the transmission device sets a search range (hereinafter referred to as a "next search range") for the next bandwidth measurement. For example, when the value of the most recent measurement result F is larger than an upper limit value of the search range set last time (the search range that has been set to measure the most recent measurement result F), a current upper limit value is determined as a center value of the next search range. When the value of the most recent measurement result F is smaller than a lower limit value of the search range set last time, a current lower limit value is determined as the center value of the next search range. When the value of the most recent measurement result F is within the last search range (excluding the upper limit value and the lower limit value of the search range), the value of the most recent measurement result F is determined as the center value of the next search range.

It is preferable that the technique described in the above-described document is used to determine a width D of the next search range such that the width D is reduced every time the number of measurement times increases. In this manner, the next search range is reset based on a past measurement result. It is therefore possible to effectively measure the available bandwidth.

As explained above, with the method that uses the transmission interval and the reception interval of the packets, the communication device 1 can perform bandwidth measurement while transmitting and receiving the packets that include media data. If the search range is set such that the available bandwidth is included in the search range, the communication device 1 can measure the available bandwidth while performing a video conference. However, the bandwidth measurement method that measures the available bandwidth while changing the transmission rate of the packets includes a factor in the occurrence of packet loss, which will be described below.

Figure 2:
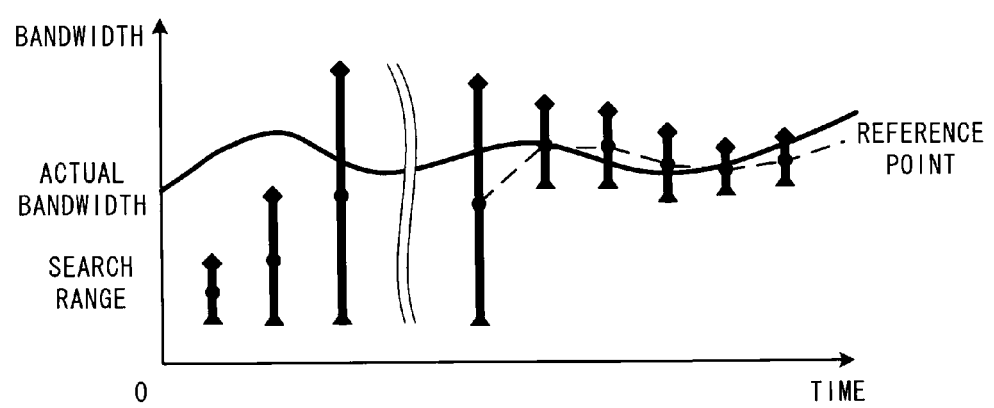
FIG. 2 is a graph showing changes over time of an actual bandwidth and a search range.

FIG. 2 shows an example of changes over time of an actual available bandwidth and the search range in the above-described bandwidth measurement method. In FIG. 2, each of the search ranges is shown by a straight line that extends in the Y direction, and the actual available bandwidth is shown by a wavy line that extends in the X direction. A center value of each of the search ranges is shown by a black circle, an upper limit value of each of the search ranges is shown by a black square, and a lower limit value of each of the search ranges is shown by a black triangle.

As shown in FIG. 2, in the above-described bandwidth measurement method, the actual available bandwidth that changes over time is measured a plurality of times by changing the search range, and the search bandwidth value Ki at the time point of the change is detected. In the explanation below, the most recent measurement result F after the search bandwidth value Ki at the time point of the change has been detected is referred to as a "reference point" that indicates the most recent available bandwidth (namely, the available bandwidth identified at the time of the previous measurement). In FIG. 2, a dotted line that connects the center values of the search ranges indicates changes over time of the reference point. Note that, it is sufficient if the "reference point" is a point that indicates a bandwidth value that will be used as a reference for the next bandwidth measurement. For example, a statistic value (for example, an average value or a predicted value of the available bandwidth) of past measurement results may be set.

After the above-described reference point has been obtained, when the bandwidth measurement is performed by packet transmission, the most recent measurement result F obtained by the previous bandwidth measurement is used as a reference point. By doing so, except in a case in which the actual available bandwidth changes to a large value from when the previous bandwidth measurement was performed, there is a high possibility that a bandwidth larger than the reference point will exceed the actual available bandwidth. In other words, it can be assumed that loss is likely to occur for the packets transmitted in a bandwidth larger than the reference point.

Figure 3:
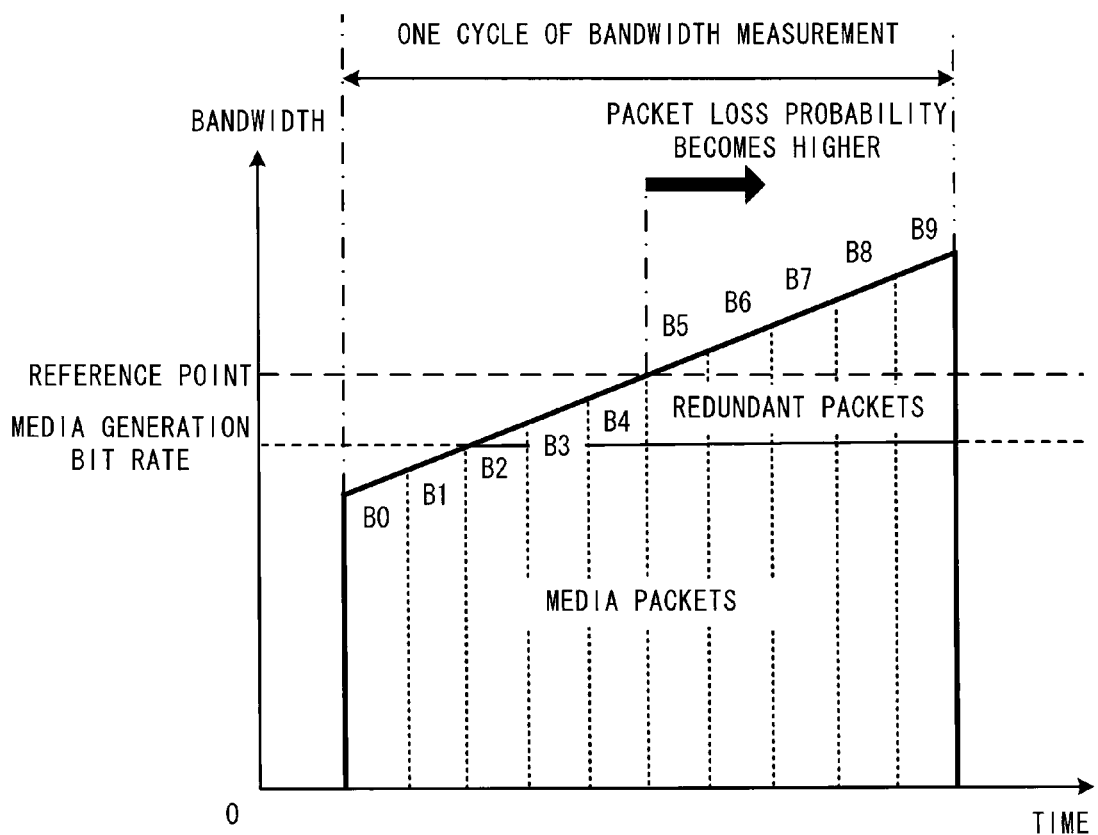
FIG. 3 is a graph showing a signal waveform that is used in one cycle of bandwidth measurement.

FIG. 3 shows an example of a signal waveform (namely, changes over time of a group of streams) that is transmitted in one cycle of bandwidth measurement in the above-described communication method. The signal waveform shown in FIG. 3 is obtained when ten streams are sequentially transmitted to each of bandwidth measurement search ranges (ten continuous bandwidth sections B0 to B9) at a "33 ms" interval, and one cycle of bandwidth measurement is performed for "330 ms". These bandwidth sections B0 to B9 are set to bandwidths having different heights such that the search range is equally divided into ten parts. The bandwidth section B0 is the lowest bandwidth, and the bandwidth becomes higher in the order of the bandwidth sections B1, B2, B3 and so on. The bandwidth section B9 is the highest bandwidth.

The bandwidth sections B0 to B4, to which streams are transmitted in a first half of each bandwidth measurement, are bandwidths on the lower side of the reference point (namely, the bandwidths lower than the reference point). There is a high possibility that packets that are transmitted to the bandwidth sections B0 to B4 are transmitted in the actual available bandwidth. Therefore, regarding the packets transmitted to the bandwidth sections B0 to B4, a packet loss probability is relatively small compared to an average packet loss probability in one cycle of bandwidth measurement.

On the other hand, the bandwidth sections B5 to B9, to which streams are transmitted in a second half of each bandwidth measurement, are bandwidths on the upper side of the reference point (namely, the bandwidths higher than the reference point). There is a high possibility that packets that are transmitted to the bandwidth sections B5 to B9 are transmitted exceeding the actual available bandwidth. Therefore, regarding the packets transmitted to the bandwidth sections B5 to B9, a packet loss probability is relatively large compared to the average packet loss probability in one cycle of bandwidth measurement.

Particularly, when packet loss occurs during communication of important data, a disadvantage to the user is significant. For example, media data including the user's face and voice and materials is important data to smoothly carry out the video conference. It is desirable that this type of important data can be accurately reproduced by the reception device.

Therefore, in the communication device 1 of the present embodiment, communication control to be described below is performed.

With reference to FIG. 4 to FIG. 10, communication processing will be explained, which is performed when the communication device 1 operates as a transmission device that transmits packets (hereinafter referred to as "measurement packets") to perform bandwidth measurement. The communication processing is performed by the CPU 10 of the transmission device in accordance with a program stored in the HDD 13 of the transmission device. The communication processing is performed in response to input, to the transmission device, of a command to transmit and receive data to and from the reception device. In the explanation below, a case is exemplified in which the communication processing is performed while a video conference is carried out between the transmission device and the reception device. The explanation will be given assuming that, when the communication processing is performed, the measurement packets are transmitted using the signal waveform shown in FIG. 3.

The transmission device of the present embodiment is provided with an encoder (not shown in the drawings) that encodes, at a predetermined bit rate, images that are captured by the camera 33 while a video conference is being performed, audio collected by the microphone 31, and the like. The encoder generates encoded data of images, audio and the like (namely, the media data) at a predetermined interval (for example, at a 10 ms interval), and stores the encoded data in a transmission buffer (not shown in the drawings) of the RAM 12 (refer to FIG. 1). The encoder may be realized in a software manner by encoding processing performed by the CPU 10, or it may be realized in a hardware manner by an encoding circuit etc. In the present embodiment, the CPU 10 that performs the encoding processing functions as the encoder.

Figure 4:
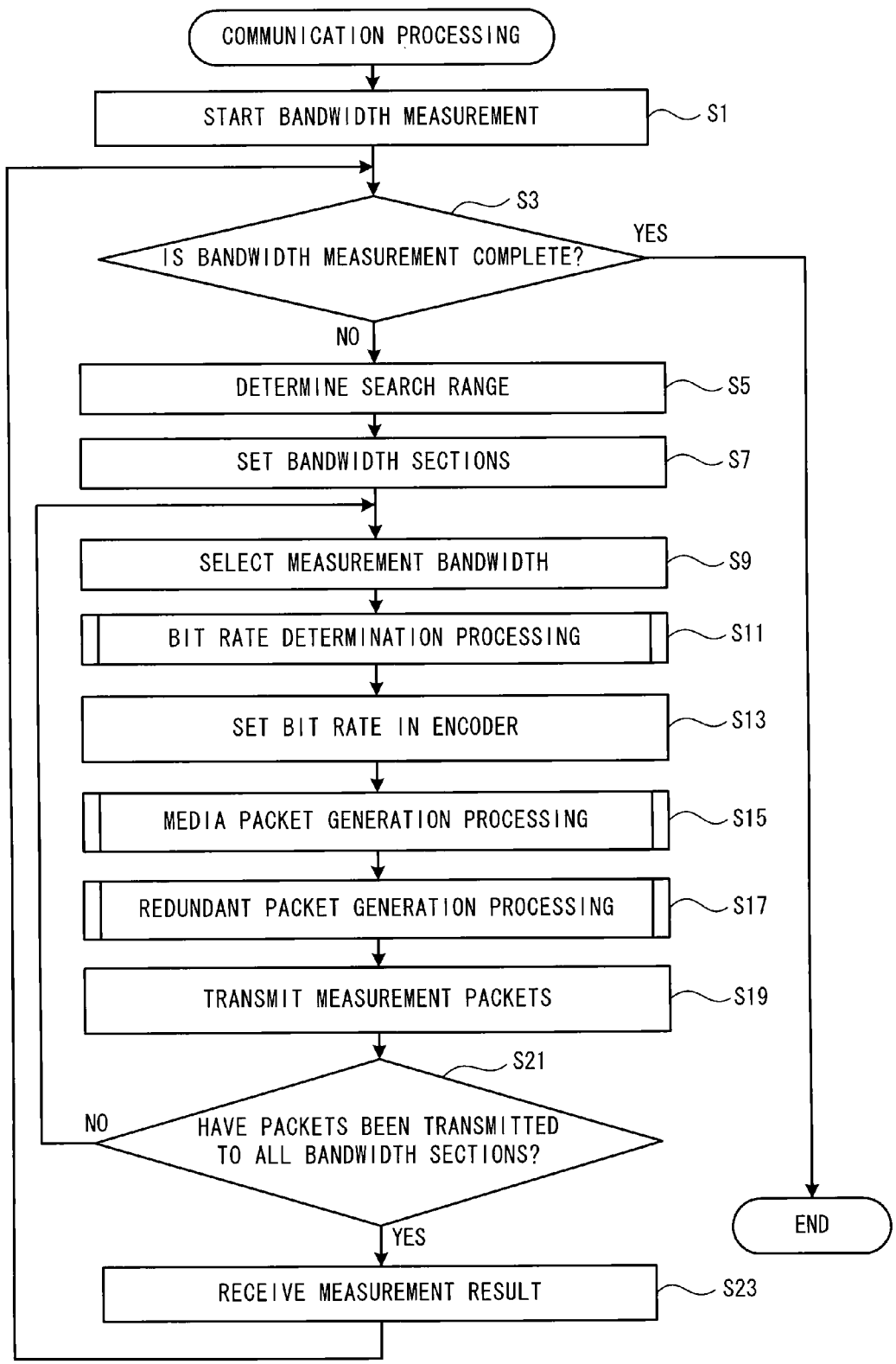
FIG. 4 is a flowchart of communication processing.

As shown in FIG. 4, in the communication processing, first, the bandwidth measurement is started using the above-described bandwidth measurement method (step S1). When the bandwidth measurement is started at step S1, the bandwidth measurement is continued at least until the reference point is detected. After the reference point has been detected, it is determined whether the bandwidth measurement is to be ended (step S3). For example, when an end command to end the video conference is input by the user, it is determined that the bandwidth measurement is to be ended (yes at step S3). In this case, the communication processing (refer to FIG. 4) is ended.

When the bandwidth measurement is not ended (no at step S3), the search range is determined as described above and the bandwidth sections are set (step S5, step S7). The measurement bandwidth is selected from among the plurality of bandwidth sections that have been set at step S7 (step S9). More specifically, from among the plurality of bandwidth sections, the bandwidth section which has not been selected as the measurement bandwidth and which has the earliest order of transmission among the bandwidth sections that have not been measured is selected as the measurement bandwidth. In the case of the signal waveform shown in FIG. 3, in a state in which none of the ten bandwidth sections B0 to B9 have been measured at all, the bandwidth section B0 having the earliest order is selected as the measurement bandwidth.

Figure 5:
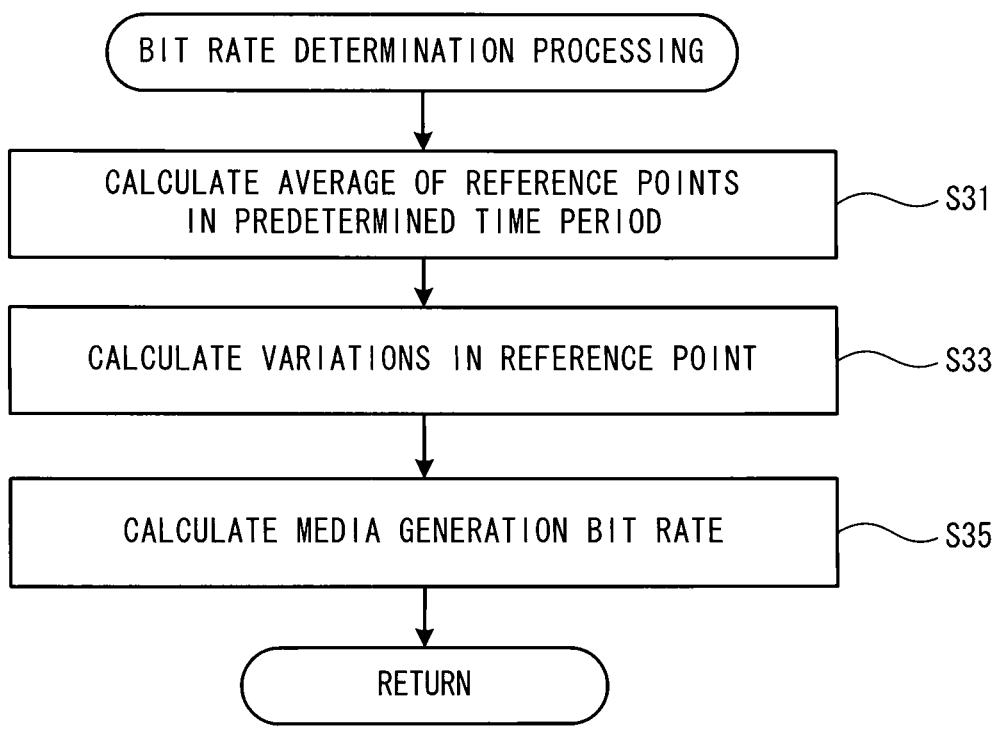
FIG. 5 is a flowchart of bit rate determination processing.

After performing step S9, bit rate determination processing shown in FIG. 5 is performed (step S11). In the bit rate determination processing, a data amount of media data that is generated by the encoder (not shown in the drawings) during one second (hereinafter referred to as a "media generation bit rate") is determined in the following manner.

As shown in FIG. 5, in the bit rate determination processing, first, an average of the reference points in a predetermined time period is calculated (step S31). For example, an average value of all the reference points that have been measured from 600 ms ago to the present is calculated. Next, variations in the reference point in the predetermined time period are calculated (step S33). For example, a standard deviation of all the reference points that have been measured from 600 ms ago to the present is calculated as the variations in the reference point. The media generation bit rate is calculated based on the average of the reference points calculated at step S31 and on the variations in the reference point calculated at step S33 (step S35). For example, a value obtained by subtracting the value "standard deviation×2" from the average of the reference points is calculated as the media generation bit rate. After performing step S35, the processing returns to the communication processing (refer to FIG. 4).

Figure 6:
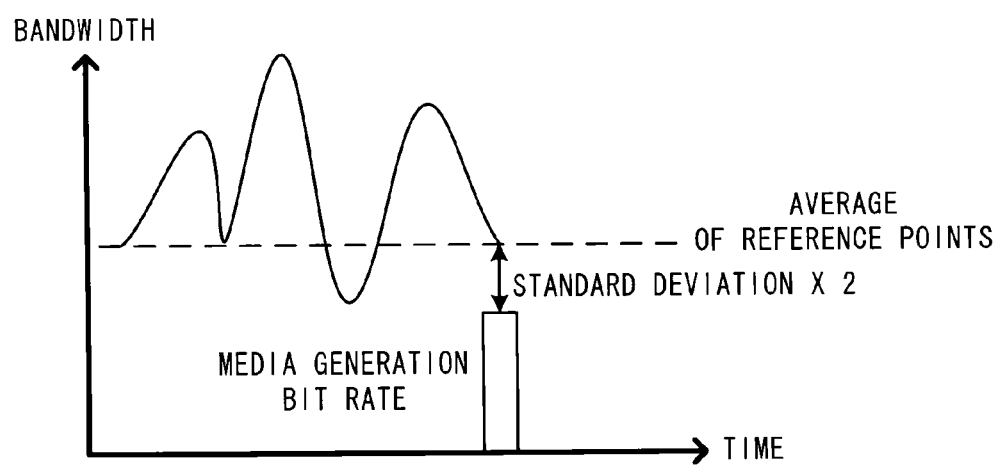
FIG. 6 is a graph showing a relationship between an average of reference points within a predetermined time period, variations in the reference point, and a media generation bit rate.

FIG. 6 indicates a relationship between the average of the reference points in the predetermined time period, the variations in the reference point, and the media generation bit rate. In the example shown in FIG. 6, a wavy line extending in the X direction indicates changes over time of the available bandwidth. A straight dotted line of a constant bandwidth that extends in the X direction indicates the average of the reference points in the predetermined time period. The magnitude of the bandwidth obtained by subtracting the value "standard deviation×2" from the average of the reference points corresponds to the media generation bit rate. Although the available bandwidth changes with time, about 96 percent of next bandwidth changes fall within a range from the average of the reference points to the value "standard deviation×2". Even when the available bandwidth changes with time, there is only a very small probability that the media generation bit rate will exceed the changed available bandwidth.

In summary, in the present embodiment, the above-described media generation bit rate is changed based on the variations in the reference point. More specifically, the larger the variations in the reference point, the lower the media generation bit rate is. Meanwhile, the smaller the variations in the reference point are, the higher the media generation bit rate is. Accordingly, it is possible to optimize the media generation bite rate in accordance with the variations in the reference point. Further, since the media data is generated at the media generation bit rate, it is possible to reduce the possibility that a data amount of the generated media data exceeds the available bandwidth that changes with time.

Figure 7:
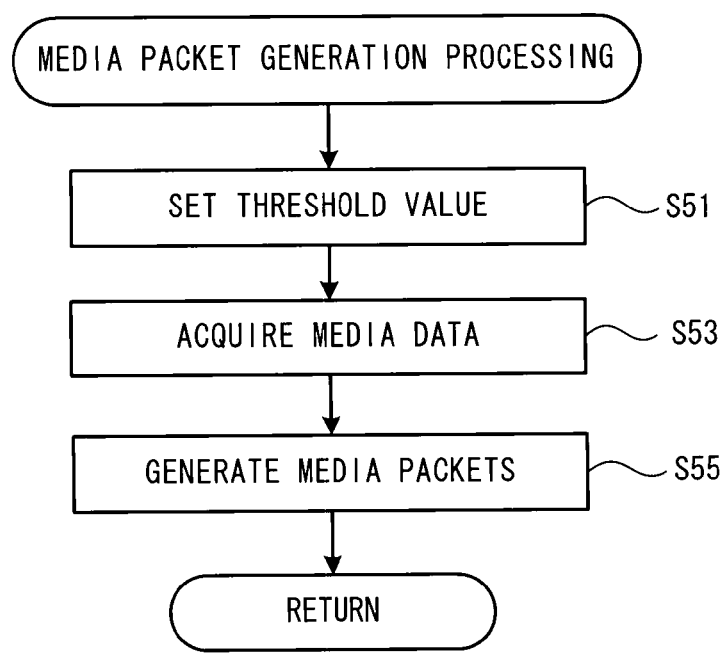
FIG. 7 is a flowchart of media packet generation processing.

Returning to FIG. 4, the explanation will be continued. The media generation bit rate determined at step S11 is set in the encoder (not shown in the drawings) (step S13). Thus, the encoder generates the media data at the set media generation bit rate. Next, media packet generation processing shown in FIG. 7 is performed (step S15). In the media packet generation processing, media packets obtained by packetizing the media data are generated in the following manner.

As shown in FIG. 7, in the media packet generation processing, first, a threshold value is set to adjust the amount of data to be transmitted (step S51). It is sufficient if the threshold value is set to fall within a range that is equal to or lower than the reference point and is equal to or higher than the media generation bit rate set at step S13. For example, an intermediate value between the reference point and the media generation bit rate is calculated and the calculated intermediate value is set as the threshold value.

The media data corresponding to the amount of data that is equal to or smaller than the threshold value set at step S51 is acquired from the transmission buffer (not shown in the drawings) at a predetermined measurement interval (step S53). In the present embodiment, the media data that is generated by the encoder (not shown in the drawings) at a constant interval (every 10 ms) is temporarily stored in the transmission buffer. At step S53, the media data corresponding to the amount of data that is equal to the threshold value is acquired from the transmission buffer at a stream transmission interval (every 33 ms). The media data acquired at step S53 is packetized and the media packets are thereby generated (step S55). After performing step S55, the processing returns to the communication processing (refer to FIG. 4).

In this manner, in the media packet generation processing (refer to FIG. 7), the media data corresponding to the amount of data that is equal to or smaller than the threshold value is acquired from the transmission buffer at the predetermined measurement interval and the acquired media data is packetized. Accordingly, it is possible to stabilize the generation rate of the media packets. Further, the threshold value is set to fall within a range that is equal to or lower than the reference point and is equal to or higher than the media generation bit rate. It is therefore possible to suppress excessive media data from being stored in the transmission buffer. Note that, in the present embodiment, the generated media data is transmitted in substantially real time. Therefore, the media generation bit rate is substantially equal to the transmission rate.

Figure 8:
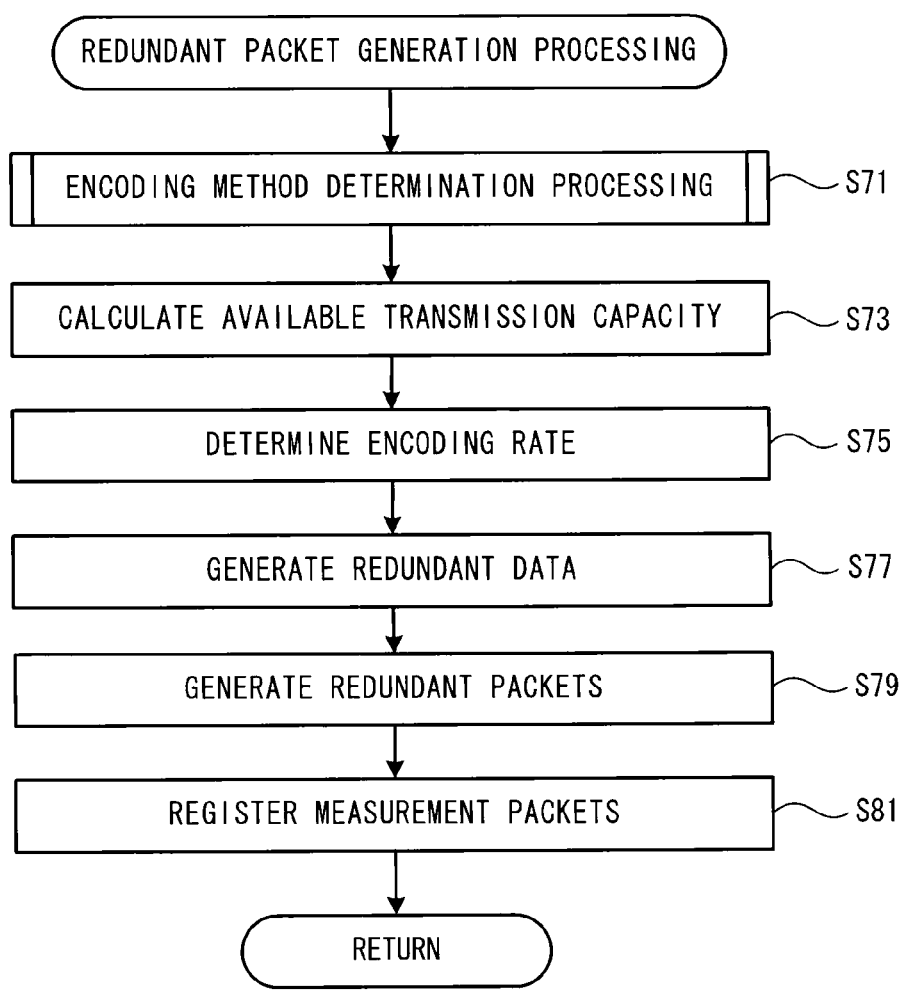
FIG. 8 is a flowchart of redundant packet generation processing.

Returning to FIG. 4, the explanation will be continued. After performing step S15, redundant packet generation processing shown in FIG. 8 is performed (step S17). In the redundant packet generation processing, redundant packets that are obtained by packetizing redundant data, which is data that can complement the media packets, are generated in the following manner.

Figure 9:
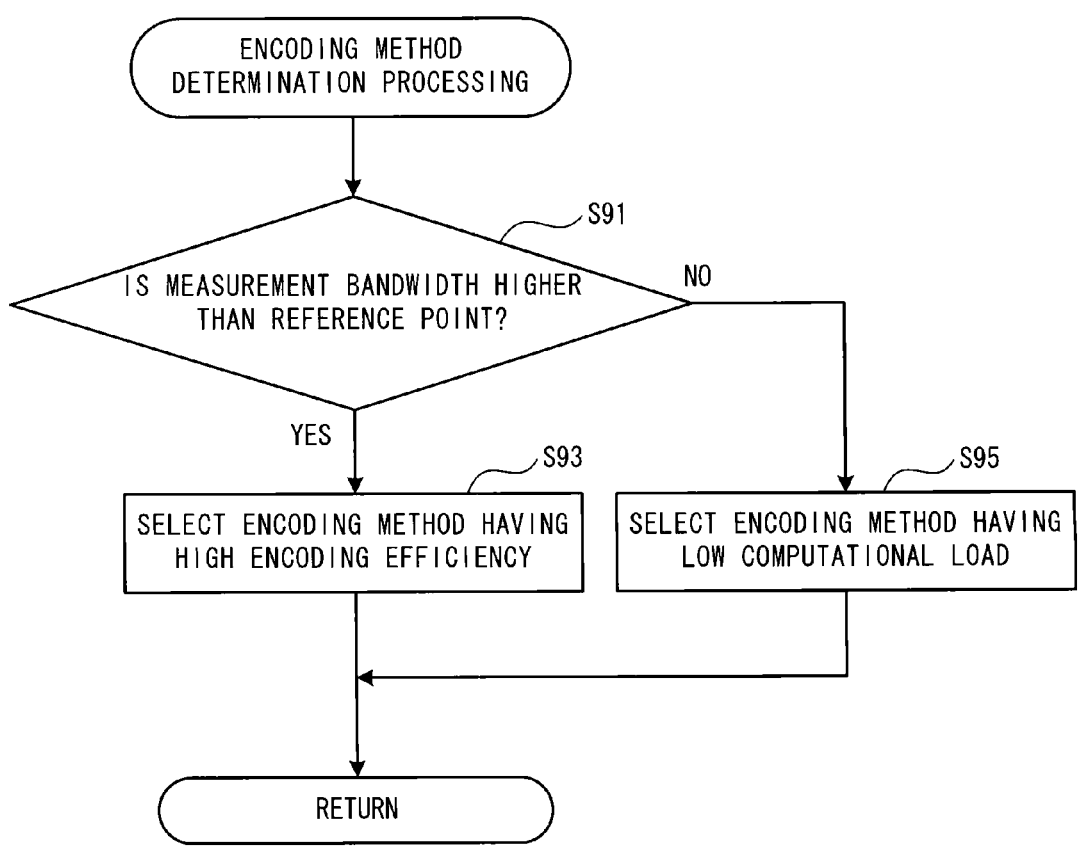
FIG. 9 is a flowchart of encoding method determination processing.

As shown in FIG. 8, in the redundant packet generation processing, first, encoding method determination processing shown in FIG. 9 is performed. In the encoding method determination processing, an encoding method for encoding measurement packets using the encoder (not shown in the drawings) is determined in the following manner.

As shown in FIG. 9, in the encoding method determination processing, first, it is determined whether the measurement bandwidth selected at step S9 is higher than the reference point (step S91). In the example shown in FIG. 3, when the measurement bandwidth is one of the bandwidth sections B5 to B9, it is determined that the measurement bandwidth is higher than the reference point (yes at step S91). In this case, it can be assumed that the measurement bandwidth is a wider bandwidth than a current available bandwidth and a maximum data transmission amount per unit time is large, while loss of transmission packets is likely to occur. Therefore, an encoding method having a high encoding efficiency is selected from among a plurality of encoding methods that are prepared in advance (step S93). Examples of the encoding method having a high encoding efficiency include an encoding method that uses a low density parity check code, and the like. If the measurement packets are encoded using a method having a high encoding efficiency, it is possible to increase a recovery rate of the packets lost in data communication.

On the other hand, in the example shown in FIG. 3, when the measurement bandwidth is one of the bandwidth sections B0 to B4, it is determined that the measurement bandwidth is equal to or lower than the reference point (no at step S91). In this case, it can be assumed that the measurement bandwidth is a narrower bandwidth than the current available bandwidth and loss of transmission packets is unlikely to occur, while the maximum data transmission amount per unit time is small. Therefore, an encoding method with a low computational load is selected from among the plurality of encoding methods that are prepared in advance (step S95). Examples of the encoding method with a low computational load include an encoding method that uses a Reed-Solomon code, and the like. If the measurement packets are encoded using a method with a low computational load, it is possible to suppress a computational load during data communication. After performing step S93 or step S95, the processing returns to the redundant packet generation processing (refer to FIG. 8).

Returning to FIG. 8, the explanation will be continued. After performing step S71, an available transmission capacity of the measurement bandwidth is calculated (step S73). The available transmission capacity is an unused transmission capacity in the measurement bandwidth, and it can be used to transmit data other than the media packets. More specifically, a difference between the measurement bandwidth selected at step S9 and the amount of data of the media packets generated at step S55 is calculated as the available transmission capacity. In the example shown in FIG. 3, if the measurement bandwidth is one of the bandwidth sections B0 and B1, the available transmission capacity is calculated as "0". If the measurement bandwidth is one of the bandwidth sections B2 to B9, a part of the bandwidth that exceeds the amount of data of the media packets in each of the bandwidth sections is calculated as the available transmission capacity.

Next, an encoding rate of the measurement packets is determined (step S75). More specifically, for the media packets generated at step S55, an encoding rate of the measurement packets is determined based on the encoding method determined at step S71 so that redundant data is generated corresponding to the amount of data that falls within the available transmission capacity calculated at step S73. In the present embodiment, the encoding method determined at step S71 is used to determine the encoding rate at which the redundant packets having the amount of data that is equal to the available transmission capacity are generated.

Based on the encoding method determined at step S71, redundant data is generated at the encoding rate determined at step S75 (step S77). At step S77, redundant data that can complement the media packets generated at step S55 is generated. The redundant data generated at step S77 is packetized and redundant packets are generated (step S79). The redundant packets generated at step S79 and the media packets generated at step S55 are registered as the measurement packets in the transmission buffer (not shown in the drawings) (step S81). After performing step S81, the processing returns to the communication processing (refer to FIG. 4). Note that, when the available transmission capacity is calculated as "0" at step S73, step S75 to step S79 are not performed, and only the media packets generated at step S55 are registered as the measurement packets (step S81).

Figure 10:
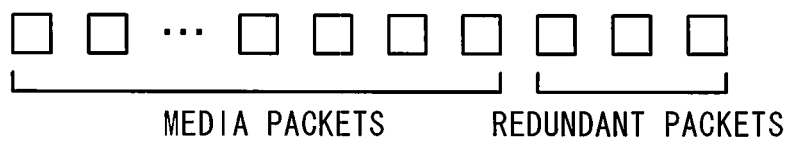
FIG. 10 is a schematic diagram of packets that are included in a stream.

FIG. 10 shows a stream of measurement packets that are generated by the above-described media packet generation processing (refer to FIG. 7) and the redundant packet generation processing (refer to FIG. 8) when the measurement bandwidth is one of the bandwidth sections B2 to B9. The measurement packets exemplified in FIG. 10 include media packets and redundant packets, and the amount of data of the measurement packets is substantially the same as that of the measurement bandwidth. Note however that, when the measurement bandwidth is one of the bandwidth sections B0 and B1, the media packets only are included in the measurement packets.

In the above-described bandwidth measurement method, the higher the measurement bandwidth, the larger the amount of data that can be transmitted in one cycle of bandwidth measurement and thus, the available transmission capacity also increases (refer to FIG. 3). In this case, the number of streams that are necessary to transmit a predetermined amount of data reduces. As a result, the processing load during data communication is reduced while the packet loss probability is increased. In the above-described redundant packet generation processing (refer to FIG. 8), when the measurement bandwidth is higher than the reference point, redundant packets with a relatively large amount of data are generated by the encoding method having a high encoding efficiency. Therefore, it is possible to generate measurement packets with a high packet recovery rate, in response to the fact that the available transmission capacity of the measurement bandwidth is relatively large and packet loss is likely to occur.

On the other hand, the lower the measurement bandwidth, the smaller the amount of data that can be transmitted in one cycle of bandwidth measurement and thus, the available transmission capacity also reduces (refer to FIG. 3). In this case, the number of streams that are necessary to transmit the predetermined amount of data increases. As a result, the processing load during data communication is increased while the packet loss probability is reduced. In the above-described redundant packet generation processing (refer to FIG. 8), when the measurement bandwidth is equal to or lower than the reference point, redundant packets with a relatively small amount of data are generated by the encoding method with a low computational load. Therefore, in response to the fact that the available transmission capacity of the measurement bandwidth is relatively small and packet loss is unlikely to occur, it is possible to generate measurement packets with a low computational load, which is unlikely to cause a delay.

Returning to FIG. 4, the explanation will be continued. After performing step S17, the stream of measurement packets recorded in the transmission buffer (not shown in the drawings) is transmitted to the measurement bandwidth selected at step S9 (step S19). After that, it is determined whether the packets have been transmitted to all the bandwidth sections set at step S7 (namely, whether there is the bandwidth that has not been measured) (step S21). When there is the bandwidth that has not been measured (no at step S21), the processing returns to step S9. The processing from step S9 to step S19 is repeatedly performed until the packets are transmitted to all the bandwidth sections set at step S7.

When there is no bandwidth that has not been measured (yes at step S21), the most recent measurement result F is received from the reception device (step S23), and the processing returns to step S3. When the bandwidth measurement is not complete (no at step S3), the search range is reset based on the received most recent measurement result F in a similar manner to the above-described measurement method, and the bandwidth measurement is continued (step S5 to step S19).

As explained above, in the communication device 1 of the present embodiment, media packets are generated at a generation rate (namely, the media generation bit rate) that is lower than the reference point. When the measurement bandwidth is higher than the media generation bit rate, redundant packets are generated at a generation rate (namely, an encoding rate of the measurement packets) that corresponds to not more than a difference between the measurement bandwidth and the media generation bit rate. The measurement packets including the media packets and the redundant packets are transmitted to the measurement bandwidth. Even when loss of the media packets occurs during data communication, the reception device can restore the lost media packets based on the redundant packets. Accordingly, it is possible to measure the available bandwidth while transmitting the media data properly.

The present disclosure is not limited to the above-described embodiment, and it is needless to mention that various modifications are possible. In the above-described embodiment, redundant packets are allocated to all the available transmission capacity of the measurement bandwidth. However, the amount of data of the redundant packets is not limited to this. It is sufficient if the redundant packets are generated such that the amount of data of the redundant packets falls within the available transmission capacity. Therefore, for example, while the redundant packets are allocated to a part of the available transmission capacity, dummy packets may be allocated to the remaining part of the available transmission capacity.

In the above-described embodiment, after the media packets and the redundant packets have been generated separately, the measurement packets that include both the media packets and the redundant packets are generated. However, the method for generating the measurement packets is not limited to this example. For example, instead of performing step S55, step S79 and step S81, the measurement packets may be generated after performing step S17 and the measurement packets may be registered in a similar manner to that at step S81. In this case, the measurement packets may be generated based on the media data acquired at step S53 and on the redundant data generated at step S77. The measurement packets to be generated may be packets in which the media packets and the redundant packets are separately included, or may be packets in which the media data and the redundant data are mixed.

In the above-described embodiment, the bandwidth measurement method described in the above-described document is used. However, the bandwidth measurement method is not limited to this method. For example, a method in which bandwidth measurement is performed based on the transmission interval and the reception interval of two packets (this method is called a "packet pair method"), and a method in which bandwidth measurement is performed based on the transmission interval and the reception interval of three packets (this method is called a "train base method") may be used as the bandwidth measurement method. In summary, any method may be used as long as the method uses the transmission interval and the reception interval of a plurality of packets and performs bandwidth measurement while transmitting and receiving the media data.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device that measures available bandwidth that can be used for data communication, while changing a transmission rate of packets, the communication device comprising:
  a processor; and
  a memory storing computer-readable instructions that, when executed by the processor, cause the communication device to perform steps comprising:
    setting, based on a bandwidth measurement result, a reference point indicating a bandwidth value to be used as a reference for a next bandwidth measurement;

determining a search range, which is a bandwidth range that becomes a measurement target centered on the reference point;

setting a bandwidth which has not been measured and which is included in the search range, as a measurement bandwidth which is a measurement target bandwidth;

generating media data at a constant interval, at a first generation rate that is lower than the reference point;

generating, in a case where the set measurement bandwidth is higher than the first generation rate, redundant data that is capable of complementing the generated media data, at a second generation rate corresponding to less than a difference between the measurement bandwidth and the first generation rate;

packetizing the generated media data and the generated redundant data to generate measurement packets; and transmitting the generated measurement packets within the set measurement bandwidth.

2. The communication device according to claim 1, wherein the instructions, when executed by the processor, further cause the communication device to perform steps comprising:

setting a threshold value to adjust a transmission data amount to fall within a range that is equal to or less than the reference point and is equal to or more than the first generation rate; and acquiring, at a predetermined measurement interval, the media data corresponding to a data amount that is equal to or less than the set threshold value, from a data storage portion that temporarily stores the generated media data, wherein the redundant data is generated to be capable of complementing the acquired media data, and wherein the measurement packets are generated by packetizing the acquired media data and the redundant data.

3. The communication device according to claim 1, wherein the instructions, when executed by the processor, further cause the communication device to perform steps comprising:

calculating a variation of the reference point based on a history of a plurality of the reference points, wherein the media data is generated at the first generation rate that has been changed based on the calculated variation of the reference point.

4. The communication device according to claim 3, wherein the media data is generated at the first generation rate, which is reduced as the variation of the reference point increases and which increases as the variation of the reference point is reduced.

5. The communication device according to claim 1, wherein the instructions, when executed by the processor, further cause the communication device to perform steps comprising:

determining whether the set measurement bandwidth is higher than the reference point;

selecting a first encoding method in a case where it is determined that the set measurement bandwidth is higher than the reference point; and selecting a second encoding method in a case where it is determined that the set measurement bandwidth is equal to or less than the reference point, the first encoding method having a higher encoding efficiency than the second encoding method, and the second encoding method having a smaller computational load than the first encoding method, wherein the redundant data is generated at the second generation rate based on the selected encoding method.

6. A communication method that is performed by a communication device that measures available bandwidth that can be used for data communication, while changing a transmission rate of packets, the communication method comprising the steps of:

setting, based on a bandwidth measurement result, a reference point indicating a bandwidth value to be used as a reference for a next bandwidth measurement, determining a search range, which is a bandwidth range that becomes a measurement target centered on the reference point;

setting a bandwidth which has not been measured and which is included in the search range, as a measurement bandwidth which is a measurement target bandwidth;

generating media data at a constant interval, at a first generation rate that is lower than the reference point;

generating, in a case where the set measurement bandwidth is higher than the first generation rate, redundant data that is capable of complementing the generated media data, at a second generation rate corresponding to less than a difference between the measurement bandwidth and the first generation rate;

packetizing the generated media data and the generated redundant data to generate measurement packets; and transmitting the generated measurement packets within the set measurement bandwidth.

7. The communication method according to claim 6, further comprising the steps of:

setting a threshold value to adjust a transmission data amount to fall within a range that is equal to or less than the reference point and is equal to or more than the first generation rate; and acquiring, at a predetermined measurement interval, the media data corresponding to a data amount that is equal to or less than the set threshold value, from a data storage portion that temporarily stores the generated media data, wherein the redundant data is generated to be capable of complementing the acquired media data, and wherein the measurement packets are generated by packetizing the acquired media data and the redundant data.

8. The communication method according to claim 6, further comprising the step of:

calculating a variation of the reference point based on a history of a plurality of the reference points, wherein the media data is generated at the first generation rate that has been changed based on the calculated variation of the reference point.

9. The communication method according to claim 8, wherein the media data is generated at the first generation rate, which is reduced as the variation of the reference point increases and which increases as the variation of the reference point is reduced.

10. The communication method according to claim 6, further comprising the steps of:

determining whether the set measurement bandwidth is higher than the reference point;

selecting a first encoding method in a case where it is determined that the set measurement bandwidth is higher than the reference point; and selecting a second encoding method in a case where it is determined that the set measurement bandwidth is equal to or less than the reference point, the first encoding method having a higher encoding efficiency than the second encoding method, and the second encoding method having a smaller computational load than the first encoding method, wherein the redundant data is generated at the second generation rate based on the selected encoding method.

11. A non-transitory computer-readable medium storing computer readable instructions that, when executed by a processor of a communication device configured to measure available bandwidth used for data communication, while changing a transmission rate of packets, perform steps comprising:
   setting, based on a bandwidth measurement result, a reference point indicating a bandwidth value to be used as a reference for a next bandwidth measurement;
   determining a search range, which is a bandwidth range that becomes a measurement target centered on the reference point;
   setting a bandwidth which has not been measured and which is included in the search range, as a measurement bandwidth which is a measurement target bandwidth;
   generating media data at a constant interval, at a first generation rate that is lower than the reference point;
   generating, in a case where the set measurement bandwidth is higher than the first generation rate, redundant data that is capable of complementing the generated media data, at a second generation rate corresponding to less than a difference between the measurement bandwidth and the first generation rate;
   packetizing the generated media data and the generated redundant data to generate measurement packets; and
   transmitting the generated measurement packets within the set measurement bandwidth.

12. The non-transitory computer-readable medium according to claim 11, wherein the steps further comprise:
   setting a threshold value to adjust a transmission data amount to fall within a range that is equal to or less than the reference point and is equal to or more than the first generation rate; and
   acquiring, at a predetermined measurement interval, the media data corresponding to a data amount that is equal to or less than the set threshold value, from a data storage portion that temporarily stores the generated media data,
   wherein the redundant data is generated to be capable of complementing the acquired media data, and
   wherein the measurement packets are generated by packetizing the acquired media data and the redundant data.

13. The non-transitory computer-readable medium according to claim 11, wherein the steps further comprise:
   calculating a variation of the reference point based on a history of a plurality of the reference points,
   wherein the media data is generated at the first generation rate that has been changed based on the calculated variation of the reference point.

14. The non-transitory computer-readable medium according to claim 13, wherein the media data is generated at the first generation rate, which is reduced as the variation of the reference point increases and which increases as the variation of the reference point is reduced.

15. The non-transitory computer-readable medium according to claim 11, wherein the steps further comprise:
   determining whether the set measurement bandwidth is higher than the reference point;
   selecting a first encoding method in a case where it is determined that the set measurement bandwidth is higher than the reference point; and
   selecting a second encoding method in a case where it is determined that the set measurement bandwidth is equal to or less than the reference point, the first encoding method having a higher encoding efficiency than the second encoding method, and the second encoding method having a smaller computational load than the first encoding method,
   wherein the redundant data is generated at the second generation rate based on the selected encoding method.

* * * * *